(12) United States Patent
Dyer et al.

(10) Patent No.: US 6,772,140 B1
(45) Date of Patent: Aug. 3, 2004

(54) HIERARCHICAL SYNTAX FOR SATELLITE COMMAND AND CONTROL DIRECTIVES

(75) Inventors: Douglas M. Dyer, Indialantic, FL (US); Albert T. Montroy, Melbourne, FL (US); Alexis J. Crovetto, Melbourne, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 0 days.

(21) Appl. No.: 09/430,917

(22) Filed: Nov. 1, 1999

(51) Int. Cl.[7] .............................. G06F 17/30; H04N 7/20
(52) U.S. Cl. ............................................. 707/3; 725/63
(58) Field of Search ...................... 244/158 R; 345/339, 345/356; 455/12.1–13.2, 427–429; 717/5–6, 8–10; 707/3, 101, 102, 103–104.1; 725/34, 63, 68, 145; 380/228, 216, 239

(56) References Cited

U.S. PATENT DOCUMENTS

| | | |
|---|---|---|
| 5,140,419 A | 8/1992 | Galumbeck et al. |
| 5,524,195 A | 6/1996 | Clanton, III et al. |
| 5,632,007 A | 5/1997 | Freeman |
| 5,675,752 A | 10/1997 | Scott et al. |
| 5,740,047 A | 4/1998 | Pilley et al. |
| 5,774,357 A | 6/1998 | Hoffberg et al. |
| 5,802,255 A | 9/1998 | Hughes et al. |
| 5,832,379 A | 11/1998 | Mallinckrodt |
| 5,867,804 A | 2/1999 | Pilley et al. |
| 5,920,477 A | 7/1999 | Hoffberg et al. |
| 5,940,753 A | 8/1999 | Mallinckrodt |
| 6,278,452 B1 * | 8/2001 | Huberman et al. .......... 345/339 |
| 6,278,991 B1 * | 8/2001 | Ebert ............................ 707/3 |
| 6,343,374 B1 * | 1/2002 | Martin .......................... 717/6 |
| 6,499,698 B2 * | 12/2002 | Maeda et al. ........... 244/158 R |

* cited by examiner

*Primary Examiner*—Uyen Le
*Assistant Examiner*—Te Ya Chen
(74) *Attorney, Agent, or Firm*—Sacco & Associates, PA

(57) ABSTRACT

A method for structuring satellite command and control directives in a hierarchical syntax comprises the steps of: defining at least one satellite command and control directive; and, associating the directive with a family of directives. The method can further comprise the step of compiling the associated families and directives into a binary persistent library. In addition, the method can include the step of displaying in a graphical user interface (GUI) a hierarchy representing the associations among the families and directives in order to assist a user in assembling satellite directives, and, in a complex system, subdirectives. Advantageously, the inventive method can present the hierarchy in a tree-structure. In addition, the method can accept a selection of a subnode; and, in response to a selection, display in the GUI parameters corresponding to the directive associated with the selected subnode.

8 Claims, 7 Drawing Sheets

| DATA TYPE | EXAMPLE VALUES | DESCRIPTION |
|---|---|---|
| integer | -15, -1, 0, 34, 50000 | May be negative. 32-bit. |
| unsigned | 0, 34, 50000 | Always zero or positive. 32-bit. |
| real | -3.5, -1.0, 0.824, 999.0 | May be negative. Double precision. |
| string | "Hello World" | May contain spaces and other characters. "length" may be defined to restrict the string value to a minimum and maximum length. The value may also contain the escaped characters '\t' (tab), '\n' (new line), '\"'(quotes). |
| symbol | HelloWord | No spaces or special formatting characters allowed. "length" may be defined to restrict the value to a minimum and maximum length. |
| boolean | True | Boolean value (may also use keyword 'bool'). Acceptable values include yes, no, true, false, YES, NO, TRUE, or FALSE. |
| time | | Reserved for future implementation. |
| date | | Reserved for future implementation. |
| keyword | | Reserved for future implementation. |

Fig. 2A

```
                                    70
                                    /
     direct <directive name> {
71 ──────── opcode   = <unsigned integer>;        # the directive opcode
73 ──────── usage    = <usage context>;                  # the directive's usage context
76 ──────── [desc    = <quoted string >;]                # a description of the directive
77 ──────── [example= <quoted string >;]            # an example of the directive
72 ──────── [access  = <unsigned integer>;]       # the access level of the directive
78 ──────── [mailbox= <quoted string >;]              # the mailbox that will handle/execute the directive zero or more unique parameters may be specified
75 ──────── [param   <parameter name> = <required or optional>;]

#zero or more unique subdirectives may be specified
74 ──────── [subdirect <subdirective name> =  {
80 ────────        opcode   = <unsigned integer>;   # the directive opcode
81 ────────        [desc    = <quoted string >;]              # a description of the directive
82 ────────        [example= <quoted string >;]           # an example of the directive
85 ────────        [access  = <unsigned integer>;]    # the access level of the directive
83 ────────        #zero or more unique parameters may be specified
84 ────────        [param   <parameter name> = <required or optional>;]
                 }]
     }
```

Fig. 3

```
Possible Directive Definition:

# parameters
param record {
    opcode = 1;
    type = unsigned;
    desc = "The number of the record in the playback recording file.";
} param rate {
    opcode = 2;
    type = real;
    default = 1.0;
    range = 0.0 to 5.0;
} param filename {
    opcode = 3;
    type = string;
} param fileversion {
    opcode = 4;
    type = unsigned;
}

Directives direct pbasi {
    opcode = 1;
    usage = anytime;
    mailbox = "PLAYBACK_ASI";
    param filename = required;
    param fileversion = optional;

subdirect pause {
        opcode = 1;
    }
    subdirect play {
        opcode = 2;
        param rate = optional;
    } subdirect goto {
        opcode = 4;
        param record = required;
    }
}
```

Fig. 4A

HIERARCHICAL SYNTAX FOR SATELLITE COMMAND AND CONTROL DIRECTIVES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of satellite command and control and more particularly to a method for structuring families of satellite command and control directives in a hierarchical syntax.

2. Description of the Related Art

Computer scientists recognize the utility of structuring objects by relation in a relational hierarchy. Typical examples of relational hierarchies include object oriented class systems and file directory tree structures. For example, the C++ and Java languages include a hierarchy of classes. Theoretically, the hierarchy of classes corresponds to entities in the real world environment. The physical structure of the hierarchy represents how the classes are related internally. Similarly, the Windows 95 operating system includes a hierarchy of devices and files contained therein. Specifically, the Explorer application included with Windows 95 organizes data residing on a device in terms of device, directory, sub-directory and file. Within this scheme, files are associated with parent sub-directories which are associated with parent directories which are associated with parent disk drives which are associated with a computer.

A flat structure, for example a list, provides an alternative to hierarchical organization of objects. For instance, in a flat file storage structure, an operating system would be compelled to organize and represent files on a computer in a list, perhaps in a sorted order. Yet, the use of a flat structure impedes a quick analysis of the relationship between individual files on a computer system. Where the number of files becomes great, the ability to analyze the relationship all but disappears.

Although hierarchical structure has become important in the field of operating systems and programming languages, a hierarchical syntax has yet to be applied to satellite command and control directives. Current methods of organizing a directive syntax includes the use of a simple list. Consequently, analyzing the relationship between directives in a traditional directive syntax in a satellite command and control system can prove to be a daunting task.

For example, presently, when a user of a satellite command and control system seeks to issue a directive, either in real-time or as part of a script, the user must either have a priori knowledge of the directive, or the user must research the appropriate directive in a reference manual. Where the directive vocabulary is limited, this task remains manageable. Still, a limited directive vocabulary necessarily implies reduced specificity for each directive. To further hone a particular directive to a specific task, however, additional parameters defined for a directive becomes necessary. Hence, in order to provide specific directives to address specific tasks, the complexity of the directive vocabulary must increase accordingly.

When presented with a complex directive syntax, however, the user's recall of an appropriate directive can become difficult. Furthermore, identifying a particularly appropriate directive among a voluminous set of directives in a reference manual can be inefficient and counterproductive. This can be especially true where each directive is stored in a flat list. Specifically, in a flat list, it can be difficult for a user to identify the relationship between each directive in the directive syntax. This difficulty can be compounded where a satellite command and control system includes a large collection of directives. In this circumstance, a user cannot identify the relationships between directives.

SUMMARY OF THE INVENTION

A method for structuring satellite command and control directives in a hierarchical syntax can provide a more intuitive structure for storing and illustrating a collection of satellite directives. Specifically, a method for structuring satellite command and control directives in a hierarchical syntax comprises the steps of: defining at least one satellite command and control directive; and, associating the directive with a family of directives, where each family includes directives logically or functionally related to each other directive contained in the family. In a more complex system, the defining step can comprise the steps of defining at least one satellite command and control subdirective logically or functionally related to a defined directive; and, associating the subdirective with the defined directive.

The method can include the step of defining a plurality of properties corresponding to at least one of the directives. Similarly, in a more complex system, the method can include the step of defining a plurality of properties corresponding to at least one of the sub-directives, as well.

The method can include the step of compiling the associated families and directives into a binary persistent library. In particular, the associated families, directives, and parameters can be stored in a text-file. Subsequently, the file can be parsed with the resulting parsed data being stored in a flat file database. The database contains a series of records including the associated families, directives, and parameters. In addition, the records can be keyed so as to permit intelligent retrieval of the records containing the families, directives, and parameters. As before, in a more complex system, the method can include the step of compiling the associated families, directives and subdirectives into a persistent library.

The method can further comprise the step of displaying in a graphical user interface (GUI) a hierarchy representing the associations among the families and directives in order to assist a user in assembling satellite directives, and, in a complex system, sub-directives. Advantageously, the inventive method can present the hierarchy in a tree-structure. Thus, the method can further comprise the step of forming a graphical tree structure having at least one node and a plurality of subnodes descending from the node. Additionally, a family of directives can be associated with the nodes. Moreover, each directive contained in the family can be associated with a corresponding subnode descending from the node. Furthermore, where applicable, each subdirective logically or functionally related to a defined directive can be associated with a corresponding child subnode descending from a parent subnode associated with the defined directive. Finally, the graphical tree structure can be displayed in the GUI. Advantageously, the method can further include accepting a selection of one subnode; and, in response to a selection, can display in the GUI parameters corresponding to the directive or sub-directive associated with the selected node.

Advantageously, the method can assist a user in selecting a satellite command and control directive. Thus, in another aspect of the invention, the inventive method can comprise the steps of: defining a hierarchy of satellite command and control directives and subdirectives where each directive and subdirective has a hierarchical relationship; storing the defined hierarchy in a binary object; subsequently retrieving the defined hierarchy from the binary object; displaying said defined hierarchy in a graphical user interface (GUI); accepting a user selection of a satellite command and control directive or subdirective contained in the defined hierarchy; and, in response to a user selection, displaying in the GUI parameters corresponding to the selected directive or subdirective. Hence, the displaying of the hierarchy and the displaying of the parameters corresponding to the selected directive or subdirective can assist the user in issuing a satellite command and control directive.

The defining step can comprise the steps of: defining a family of directives for grouping a plurality of directives logically or functionally related to each directive in the family; defining a plurality of directives, each directive logically or functionally related to each other directive; including in the defined family, the plurality of directives; and, storing the family of directives including each defined directive in a file. The compiling step comprises the steps of: serializing each directive in the family into a binary stream; streaming the binary stream into a binary object, where the binary object can retain the hierarchical relationship between each directive and subdirective; and, storing the binary object in an electronic storage. Finally, the retrieving step can comprise the steps of: retrieving from said electronic storage the binary object; retrieving from the binary object each directive in the family; retrieving from the binary object each subdirective associated with a retrieved directive in the family; and, retrieving from the binary object each parameter associated with a retrieved directive or subdirective in the family.

In yet another aspect of the invention, a method for assisting the selection of a satellite command and control directive can comprise the steps of: structuring a plurality of satellite command and control directives and subdirectives in a family of directives and subdirectives wherein each directive and subdirective in the family has a hierarchical relationship to each other directive and subdirective; compiling the family of directives and subdirectives into a binary object; retrieving from the binary object the family of directives and subdirectives; displaying the family of directives and subdirectives in a graphical tree in a graphical user interface (GUI); accepting a user selection of a directive or subdirective in the graphical tree; and, displaying in the GUI parameters associated with the selected directive or subdirective, whereby the GUI can assist a user to resolve hierarchical relationships between each directive and subdirective in a satellite command and control directive syntax.

BRIEF DESCRIPTION OF THE DRAWINGS

There are presently shown in the drawings embodiments which are presently preferred, it being understood, however, that the invention is not limited to the precise arrangements and instrumentalities shown.

FIG. 2A is a table of permitted data types for use with families, directives, subdirectives, and parameters.

FIG. 3 is a listing of a directive definition syntax.

FIG. 4A is a listing of an exemplary directive definition.

DETAILED DESCRIPTION OF THE INVENTION

The invention includes a method for structuring families of space vehicle command and control directives in a hierarchical syntax. The inventive method organizes a large collection of satellite directives in an intuitive manner. Furthermore, the organization of each directive in a hierarchical command syntax illustrates the hierarchical relationship between each directive.

Command and Control Language (CCL) is the language used to define directives that may be given to processes within a satellite command and control system. Still, the inventive method is not limited in this regard. Rather, the inventive method can be applied equally as well with any command language used to define directives in a satellite command and control system.

Figure 1:
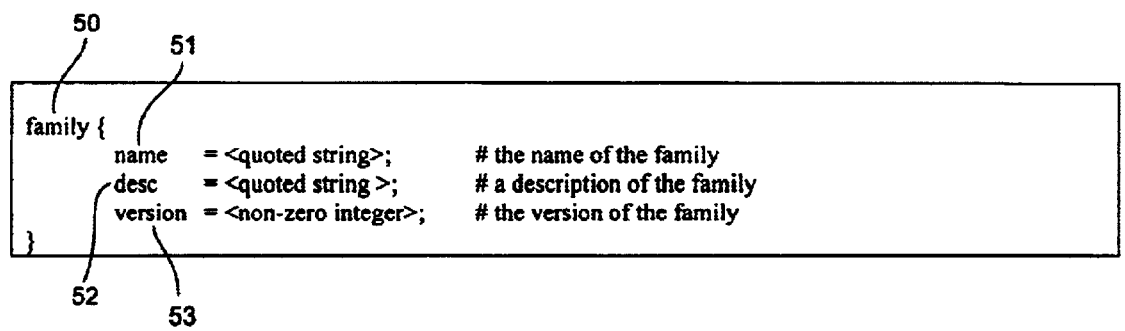
FIG. 1 is a listing of a family definition syntax.

CCL centers on families of directives. Families are used to organize directives in logical or functional groups. Each family is defined independent of other families. A family can be defined in a Command Interface Description (CID) file. The CID file preferably has a .CID extension and preferably defines only one family therein. The first section of the CID file can contain a family definition. FIG. 1 illustrates the preferred syntax for a family definition. A family 50 can be defined by specifying a family name 51, a description 52, and a version number 53. Preferably, the family name 51 is unique.

The next section of the CID file preferably is reserved for parameter definitions that can be used by the directives of the family. Parameters at minimum must contain a name, type, and opcode. FIG. 2A lists possible data types for each parameter. The data types preferably include integers, unsigned integers, real numbers, strings, symbols, and booleans. In addition, time, date and keyword data types preferably are reserved for future iterations of the command syntax.

Figure 2B:
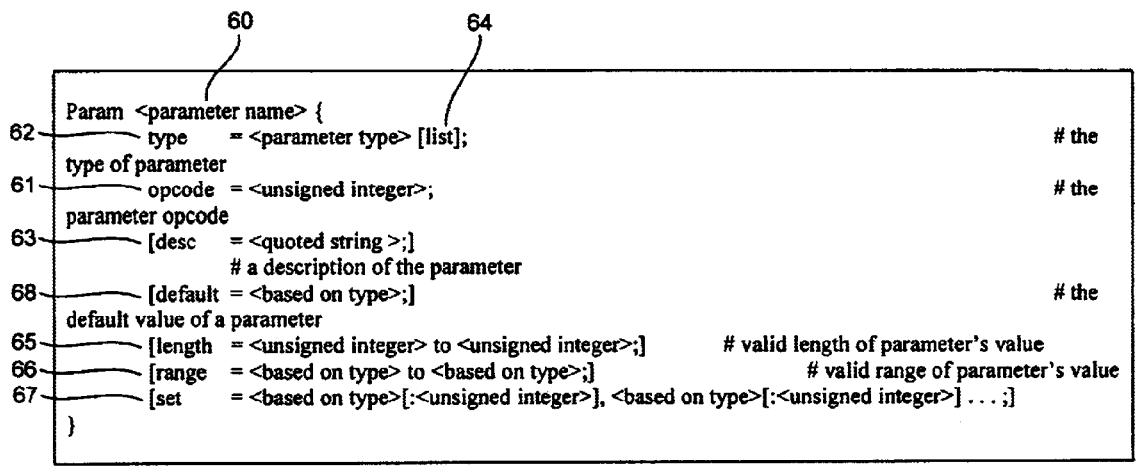
FIG. 2B is a listing of a parameter definition syntax.

FIG. 2B illustrates a preferred syntax used in defining a parameter. All parameters preferably have a name 60 that is unique among all parameters in the CID file. Moreover, parameters in each CID file preferably are unique with respect to opcode 61 as well. All parameters preferably are declared to be of a valid type 62. Any parameter may have a description 63 defined for that parameter. The description 63 value preferably conforms to the string data type described in FIG. 2A.

A parameter may be a "list" parameter. Specifically, as a list parameter, a parameter can be assigned several values at once. If a parameter is a list parameter, the multiple values can be assigned using an '&' (ampersand) as a delimiter. For example the default option for a string type variable may appear as "default='one' & 'two' & 'three';". The list option 64 can be denoted in the type declaration of the parameter, for example "type=unsigned list;".

The length definition 65 can be valid for parameters having a string or symbol type. The length definition 65 permits a user to define a minimum and maximum allowable length for the value of the parameter. As an example, a length definition 65 for a string or symbol parameter may appear as "length=4 to 37;" where 4 and 37 are the minimum and maximum allowable lengths, respectively.

Similarly, the range definition 66 can be valid for parameters having an integer, unsigned, or real type. The range definition 66 permits a user to define a minimum and maximum allowable value for the value of the parameter. A range definition 66 for a real parameter may appear as "range=−4.37 to 37.4;" where −4.37 and 37.4 are the minimum and maximum allowable values respectively.

The set definition 67 can be valid for all parameter types. The set definition 67 allows the user to define a set of values that are valid for the parameter. If a parameter has a set defined, the parameter may not be assigned a value that is not in the defined set. The set values can be case insensitive implying that upon assignment, if the assigned value matches the spelling but not the case of a set member, the assignment is interpreted as valid. Thus, a set definition 67 for a symbol type parameter may appear as "set=red, yellow, green;" which would allow the parameter to be assigned values such as "RED", "Green", or "yellow".

Advantageously, the set definition 67 also allows for enumeration of the set values. Among other uses, the set definition 67 allows the user to interrogate the corresponding parameter's value and perform logic based upon the enumerated value as opposed to string comparisons. To specify enumerated values the set value preferably is followed by a ':' and an unsigned integer. If an enumerated value is not specified, the set member's enumerated value becomes the set member's ordinal position in the list starting at 0 (zero) and increasing from left to right. Thus, the set definition 67 "set=red, yellow, green;" is functionally equivalent to "set= red: 0, yellow: 1, green: 2;". For example assume the set definition 67 "set=red: 55, orange: 23, yellow, green: 0, blue: 23;". In this example, both blue and orange have identical enumerated values, but the enumerated value of yellow is 2 because of it's position in the list and red's is 55.

A parameter preferably can be assigned a default value by using the default option 68 in the parameter definition. For example a default value for an integer parameter may be specified as "default=16;". Any restrictions on the value such as defining a set, length, or range can be enforced along with type checking.

The third section of the CID file is reserved for directive definitions. The directives defined in this portion of the CID file can utilize the parameters defined in the second section of the CID file. The directives are the actual commands that can be syntax checked and executed by a user's customized command and control program. As shown in FIG. 3, a directive definition preferably contain a name 70, opcode 71, access level 72, and a usage context 73. Directives may also contain subdirectives 74, parameters 75, a description 76, and an example 77. The syntax for defining a directive is shown in FIG. 3.

Preferably, each directives has a name 70 that is unique among directives in the CID file. Ideally, each directive has a name 70 that is unique to all directives in the defined system in order to avoid possible confusion. Moreover, directives in each CID file preferably are unique with respect to opcode 71, both within the CID file and system-wide.

Preferably, each directive has a defined usage or usage context 73. The usage context 73 is the context in which it is desired that the directive be used, issued, or executed. Valid values for the usage of a directive include "offline", "online", and "anytime". The offline usage indicates that the directive is not issued from a graphical user interface (GUI) interface. Rather, the directive is reserved for some internal use such as configuration or model generation. The online usage indicates that the directive can be issued from a GUI at runtime. Anytime usage denotes the ability for the directive to be used both online and offline.

A directive can have a description 76. The description value preferably conforms to the string data type described in FIG. 2A. In addition, a directive can include an example 77. The example value preferably conforms to the string data type described in FIG. 2A.

A directive can have an access level 72 defined for that directive. The access level 72 can be an unsigned integer value that can be validated against an access level integer associated with a user to determine if that user has the privilege of issuing the directive. Preferably, higher access level values correspond to more restrictive access. By way of example, a user associated with access level 3 can process directives having a defined access level of 3 or less. By default, directives are assigned an access level 0 which allows free access to the directive for all users.

A directive can include a defined mailbox name 78. The mailbox name 78 preferably conforms to the string data type described in FIG. 2A. A directive's mailbox name 78 can be used if a directive is processed in a distributed CCL processing environment such as the Calypso® GUI environment, manufactured by Exigent International, Inc. of Melbourne, Fla. The mailbox can be defined in another process or within the same process from which the directive was issued. If a mailbox has been defined, preferably the recipient process includes sufficient functionality to receive, handle/execute, and reply to the directive. If a mailbox name 78 is defined, when invoked, the directive can be transmitted to the mailbox identified by mailbox name 78. Preferably, a mailbox name 78 is not included with the directive if the directive usage 73 is offline. Conversely, a mailbox name 78 preferably is included with the directive if the directive usage 73 is either online or anytime.

If parameters are defined in the parameter section of the CID file then the directive can utilize the defined parameters 75. In using a defined parameter 75, the directive definition can specify whether the parameter 75 is required or optional. For example, a voltage parameter can be defined and a corresponding directive can require the use of voltage parameter by including in the directive definition, "param voltage=required;". Advantageously, directives may define or contain as many parameters 75 as desired.

A directive can include subdirectives 74. As shown in FIG. 3, a subdirective 74 is essentially a directive that is contained within a directive and is similar to the directive in it's definition, syntax, and options. A directive can define as many subdirectives 74 as desired. Preferably, subdirectives 74 are not "required" as in the case of parameters. Moreover, preferably, only one subdirective 74 can be included in an issued directive string.

Still, several options that can be required or permitted in a directive preferably are not allowed in a subdirective 74. For example, the usage option 73 preferably is not allowed in a subdirective 74. Instead, the subdirective 74 can inherit the usage of the parent directive. Moreover, because a subdirective 74 preferably is contained in a directive, a separate mailbox needn't be defined for the subdirective 74. Finally, subdirectives 74 preferably do not have subdirectives of their own. Notwithstanding, the invention is not limited in this regard. Rather, in an alternative embodiment, subdirectives 74 can have subdirectives included therein.

But, one skilled in the art will recognize the increased complexity associated with nested subdirectives. Hence, to reduce the complexity of the hierarchical syntax, the preferred embodiment excludes nested subdirectives.

Each subdirective 74 preferably has a name unique among all subdirectives contained in the parent directive. Likewise, preferably the subdirective 74 includes a unique opcode 81. Additionally, each subdirective 74 can have a description 82. The description value preferably conforms to the string data type described in FIG. 2A. Finally, each subdirective 74 can have an example 85. The example value preferably conforms to the string data type described in FIG. 2A.

Like directives, a subdirective 74 can have an access level 83 defined for that subdirective 74. Logically, a user cannot access a subdirective 74 if the user lacks a sufficient access level 72 to issue the parent directive. Thus, the access level 83 preferably is relative to the access level 72 of the parent directive. Specifically, access levels 72, 83 for directives and subdirectives 74 are cumulative. For example, to access a subdirective 74 having an access level 83 of 3 which is contained in a directive having an access level 72 of 2, a user must have an access level of 5 (3+2) to access the subdirective 74, but merely an access level of 3 to access the directive. If an access level 83 has not been defined, the default access level for a subdirective 74 preferably is equivalent to the access level 72 of the parent directive.

FIG. 4A shows a directive definition for the directive 20 "pbasi". As shown in the figure, the directive 20 includes several optional parameters. Specifically, four defined parameters 10 are shown: "record", "rate", "filename" and "fileversion". Each has a unique name 15 and opcode 16. The parameter 10 record is of data type 11 unsigned integer and includes a corresponding description 12. Similarly, the parameters 10 filename and fileversion are of data types 11 string and unsigned integer, respectively. Finally, the parameter 10 rate is of data type 11 real number and must fall within the range 130.0 to 5.0, and has a default value 14 of 1.0.

The directive 20 includes a unique opcode 21, an anytime usage 22, and a specified mailbox 23. The directive 20 further includes two parameters 10, defined earlier in the CID file: filename and fileversion. The parameter 10 filename is a mandatory parameter as indicated by the required keyword 24. In contrast, the parameter 10 fileversion is an optional parameter as indicated by the optional keyword 25.

Finally, the directive 20 includes three subdirectives 30, each having a unique name 31: "pause", "play" and "goto". Each subdirective has a unique opcode 32. In addition, the subdirective 30 play includes the parameter 10 rate which is specified as an optional parameter by the optional keyword 25. In contrast, the subdirective 30 goto includes the parameter 10 record which is specified as a required parameter by the required keyword 24.

Figure 4B:
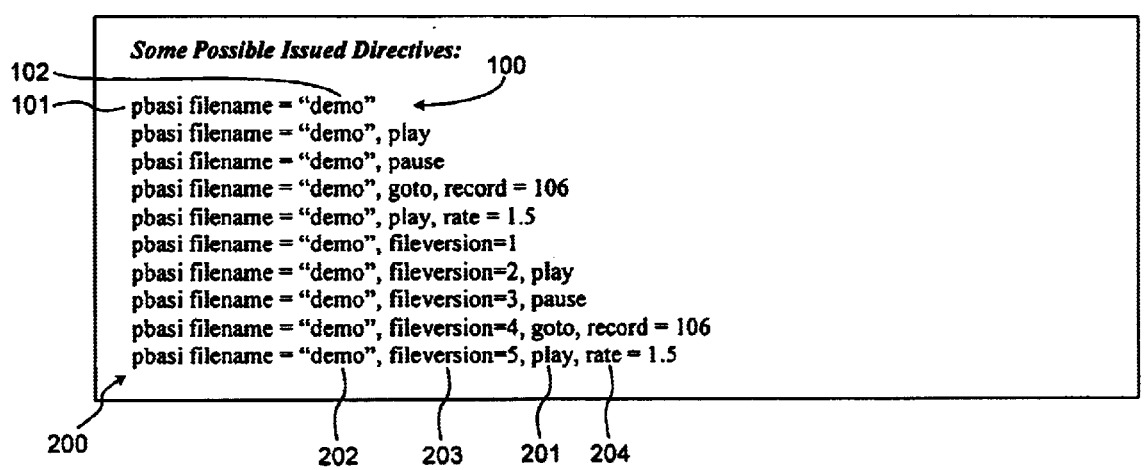
FIG. 4B is a listing of possible issued directives corresponding to the exemplary directive definition shown in FIG. 4A.

FIG. 4B lists possible issued directives corresponding to the directive 20 pbasi as defined in FIG. 4A. From the figure, it will be apparent to one skilled in the art that the first directive 100 includes the directive name 101 and the required filename parameter 102, "demo". The first directive 100 does not invoke any of the three associated subdirectives. Furthermore, the first directive 100 does not include the optional fileversion parameter.

In contrast, the tenth directive 200 invokes the subdirective 201 play. The tenth directive 200 includes the required file name parameter 202, "demo", the optional fileversion parameter 203, and the optional subdirective parameter 204 rate. In addition, in the tenth directive 200, the real number value 1.5 is assigned to the rate parameter 204.

When a directive family has been fully defined in a CID file, a command compiler, for instance "cclgen" developed by Exigent International, Inc. of Melbourne, Fla., can compile the definitions contained in the CID file into a binary persistent library or "compiled family". Regardless of the particular command compiler, a parsing program, widely available in the art, can parse the CID file, separating the constituent components, including parameters, directives and subdirectives, and store each into records in a binary object which can retain the hierarchical relationship between each of the constituent components. Specifically, the compiler can extract each of the parameters, directives, and subdirectives, serializing each. The compiler can stream the serialized data out to the binary object, using conventional file creation and streaming techniques widely available, for instance in the C++ file streaming library.

The command compiler can accept as a parameter the name of the CID file. For instance, a proper invocation of the cclgen command compiler could include, "cclgen myfamily.cid" where "myfamily.cid" is the name of the CID family. As output, the command compiler, in particular the cclgen command compiler, can produce a compiled family "myfamily.fam". In addition, the compiled family can be stored in a file directory identified by a compiler environment variable.

Figure 5:
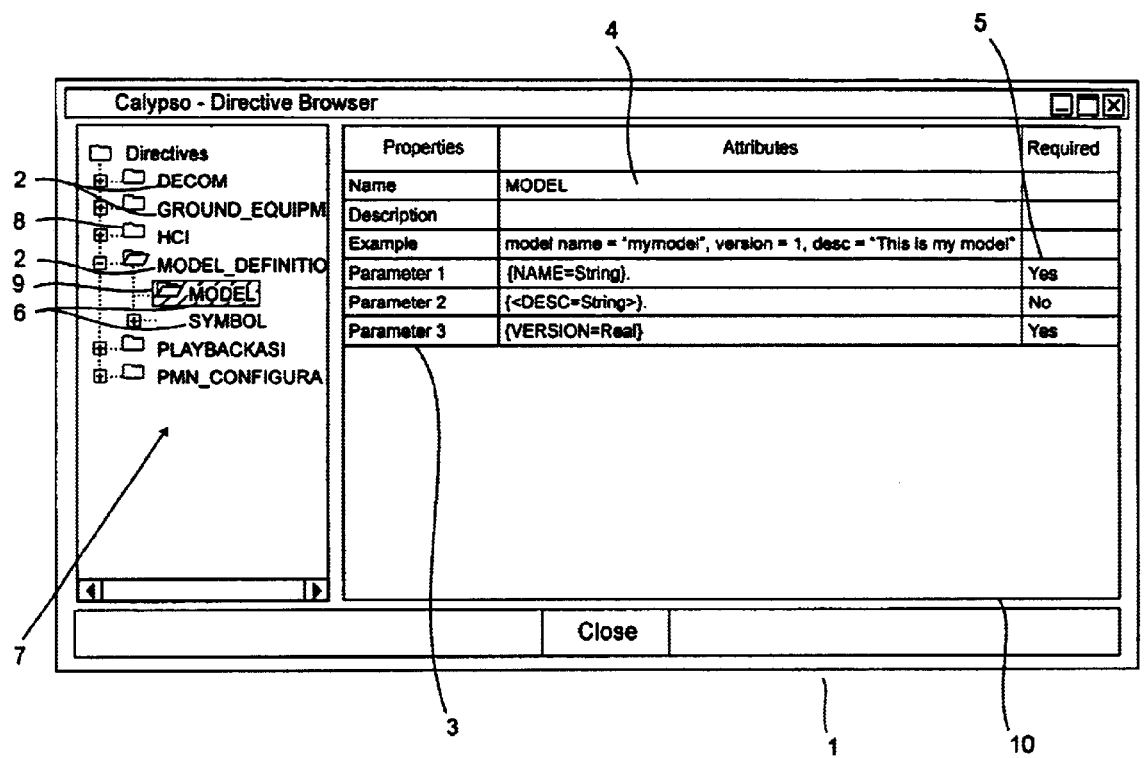
FIG. 5 is an illustration of a graphical user interface for browsing a command and control directive hierarchy.

FIG. 5 illustrates a preferred GUI, alternately referred to as a directive browser 1, for displaying the hierarchical syntax compiled by the command compiler. For each defined family 2 stored in a CID file in a file directory denoted by the environment variable, the parameters 3, directives 6 and subdirectives (not shown) defined in each CID file and subsequently stored in a compiled family file can be used directly by the directive browser 1 to display the hierarchical syntax. Specifically, the directive browser 1 can utilize an API directed to retrieving data from the compiled family in order to retrieve each family 2 and directive 6 in the hierarchy. Subsequently, the hierarchy can be displayed according to family-directive-subdirective relationships.

For example, the Calypso program includes a C++ class for interfacing other applications to the database containing the hierarchical syntax. The class, CCLProcessor, includes the method getFamilies( ) which can retreive families 2 from the database. From the retrieved families, directives can be retrieved by using the methods, FamilyDef::getDirectiveByName( ), FamilyDef::getDirectiveByOpcode( ), or FamilyDef::getDirectives( ). Once a directive has been retrieved, the parameters and subdirectives are accessible by similar methods included in the class CCLProcessor. The methods can include: DirectDef::getParamByIndex( ), DirectDef::getParams( ), DirectDef::getSubDirectiveByindex( ), and DirectDef::getSubDirectives( ).

The resulting hierarchy can be displayed in the directive browser 1 as a collapsible tree 7 where each family 2 is a node 8, each directive 6 corresponding to a particular family 2 is an attached parent subnode 9, and each subdirective (not shown) to a directive 6 is attached to a child subnode (not shown) of the directive parent subnode 9. A user can expand and collapse the various portions of the collapsible tree 7 by selecting a node 8 or sub-node 9 with an input device, preferably a mouse, and double-clicking on the same.

Once selected, a directive 6 can display in a frame 10 the parameters 3 corresponding to the selected directive 9. Similarly, once selected, a sub-directive (not shown) can display in the frame 10 the parameters 3 corresponding to the selected sub-directive. Moreover, the attributes 4 assigned to each parameter 3 can be displayed in the same frame 10. Finally, whether the parameter 3 is required or optional can be indicated in the required field 5.

Thus, using the hierarchical syntax, a user can logically define relationships between families of directives, directives and subdirectives. In addition, in coordination with the directive browser, a user can visually identify the relationships between the directives, subdirectives and corresponding directive families which manage those directives and subdirectives. Finally, the user can identify parameters associated with a directive or subdirective and can determine whether a parameter is optional or required.

What is claimed is:

1. A method for assisting the selection of a satellite command and control directive and parameters to be inserted in said directive comprising the steps of:
   defining a hierarchy of satellite command and control directives and subdirectives wherein each directive and subdirective has a hierarchical relationship;
   storing said defined hierarchy in an electronic storage for subsequent access and retrieval;
   retrieving said defined hierarchy from said electronic storage;
   displaying said defined hierarchy in a graphical user interface (GUI);
   accepting a user selection of a satellite command and control directive or subdirective in said defined hierarchy; and,
   responsive to said selection, displaying in said GUI predefined parameters in a list corresponding to said selected directive or subdirective in said defined hierarchy,
   whereby said displaying of said hierarchy and said displaying of said list of predefined parameters corresponding to said selected directive or subdirective assists said user in issuing a satellite command and control directive.

2. The method according to claim 1, wherein said defining step comprises the steps of:
   defining a family of directives for grouping directives logically or functionally related to each other directive grouped in said family;
   defining a plurality of directives, each said directive logically or functionally related to each other said directive;
   including in said defined family, said plurality of directives; and,
   storing said family of directives including each said defined directive in a file.

3. The method according to claim 2, wherein said compiling step comprises the steps of:
   serializing each directive in said family into a binary stream;
   streaming said binary stream into a binary object, said binary object retaining said hierarchical relationship between each directive and subdirective; and,
   storing said binary object in said electronic storage.

4. The method according to claim 3, wherein said retrieving step comprises the steps of:
   retrieving from said electronic storage said binary object containing said family of directives;
   retrieving from said binary object each directive in said family;
   retrieving from said binary object each subdirective associated with a retrieved directive in said family; and,
   retrieving from said binary object each parameter associated with a retrieved directive or subdirective in said family.

5. A method for assisting the selection of a satellite command and control directive and parameters to be inserted in the directive comprising the steps of:
   structuring a plurality of satellite command and control directives and subdirectives in a family of directives and subdirectives wherein each directive and subdirective in said family has a hierarchical relationship to each other directive and subdirective;
   compiling said family of directives and subdirectives and storing the resulting object in an electronic storage for subsequent access and retrieval;
   retrieving from said electronic storage said family of directives and subdirectives;
   displaying said family of directives and subdirectives in a graphical tree in a graphical user interface (GUI);
   accepting a user selection of a directive or subdirective in said graphical tree; and,
   displaying in said GUI predefined parameters in a list associated with said selected directive or subdirective,
   whereby said GUI assists a user to resolve hierarchical relationships between each directive and subdirective in a satellite command and control directive syntax.

6. The method according to claim 5, wherein said structuring step further comprises the steps of:
   selecting said family of directives to include directives that are logically or functionally related to each other directive in said family; and,
   storing said family of directives including each said defined directive in a file.

7. The method according to claim 5, wherein said compiling step comprises the steps of:
   serializing each directive in said family into a binary stream;
   streaming said binary stream into a binary object, said binary object retaining said hierarchical relationship between each directive and subdirective; and,
   storing said binary object in said electronic storage.

8. The method according to claim 7, wherein said retrieving step comprises the steps of:
   retrieving from said electronic storage said binary object containing said family of directives;
   retrieving from said binary object each directive in said family;
   retrieving from said binary object each subdirective associated with a retrieved directive in said family; and,
   retrieving from said binary object each parameter associated with a retrieved directive or subdirective in said family.

* * * * *